United States Patent
Xie et al.

(10) Patent No.: US 11,111,024 B2
(45) Date of Patent: Sep. 7, 2021

(54) FOLDABLE RAM AIR INLET FILTER

(71) Applicant: HONEYWELL INTERNATIONAL INC., Morris Plains, NJ (US)

(72) Inventors: Feng Xie, Shanghai (CN); Yao Li, Shanghai (CN); Xiaolei Fu, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 782 days.

(21) Appl. No.: 15/869,638

(22) Filed: Jan. 12, 2018

(65) Prior Publication Data

US 2019/0217959 A1    Jul. 18, 2019

(51) Int. Cl.
| | |
|---|---|
| B64D 33/02 | (2006.01) |
| B64D 13/06 | (2006.01) |
| B01D 45/08 | (2006.01) |
| B01D 46/00 | (2006.01) |
| F02C 7/042 | (2006.01) |
| F02C 7/052 | (2006.01) |

(52) U.S. Cl.
CPC ............ *B64D 13/06* (2013.01); *B01D 45/08* (2013.01); *B01D 46/0016* (2013.01); *B01D 46/0027* (2013.01); *B01D 46/0041* (2013.01); *B64D 33/02* (2013.01); *F02C 7/042* (2013.01); *F02C 7/052* (2013.01); *B64D 2013/0618* (2013.01); *B64D 2013/0651* (2013.01); *B64D 2033/022* (2013.01); *B64D 2033/0246* (2013.01)

(58) Field of Classification Search
CPC ................... B64D 13/06; B64D 33/02; B64D 2013/0618; B64D 2033/0246; B64D 2013/0651; F02C 7/042; F02C 7/052; B01D 46/00; B01D 46/0002
See application file for complete search history.

(56) References Cited

U.S. PATENT DOCUMENTS

| | | |
|---|---|---|
| RE22,656 E | 7/1945 | Thompson |
| 2,381,705 A | 8/1945 | Vokes |
| 2,976,952 A | 3/1961 | Holland, Jr. |

(Continued)

FOREIGN PATENT DOCUMENTS

| | | |
|---|---|---|
| EP | 0075054 A1 | 3/1983 |
| EP | 1257468 A2 | 11/2002 |

(Continued)

OTHER PUBLICATIONS

Response to Extended Search Report dated May 15, 2019, from counterpart European Application No. 19151431.4, filed Aug. 27, 2019, 9 pp.

(Continued)

*Primary Examiner* — Brian M O'Hara
*Assistant Examiner* — Keith L Dixon
(74) *Attorney, Agent, or Firm* — Shumaker & Sieffert, P.A.

(57) ABSTRACT

A filtering assembly that receives an inlet air includes a modulation panel subassembly, an air filter subassembly downstream of the modulation panel subassembly, wherein the air filter subassembly is configured to discharge the inlet air from the filtering assembly, and an arm subassembly configured to move the modulation panel subassembly and to move the air filter subassembly. The air filter subassembly moves into and out of a flow of the inlet air.

20 Claims, 5 Drawing Sheets

(56) References Cited

U.S. PATENT DOCUMENTS

| | | | |
|---|---|---|---|
| 3,421,296 A | | 1/1969 | Beurer, Sr. |
| 3,449,891 A | | 6/1969 | Shohet et al. |
| 4,250,703 A | | 2/1981 | Norris et al. |
| 4,312,645 A | * | 1/1982 | Mavros .................. B01D 46/46 96/400 |
| 4,698,078 A | * | 10/1987 | Mavros .................. B01D 46/10 55/313 |
| 5,064,457 A | * | 11/1991 | Weber .................... B08B 15/026 55/385.2 |
| 5,697,394 A | | 12/1997 | Smith et al. |
| 6,264,137 B1 | | 7/2001 | Sheoran |
| 7,491,253 B2 | | 2/2009 | Wilson |
| 7,575,014 B2 | | 8/2009 | Stelzer |
| 8,439,295 B2 | | 5/2013 | Belyew |
| 9,719,352 B2 | | 8/2017 | Sheoran et al. |
| 10,723,475 B2 | * | 7/2020 | Bergami ............... F02C 7/055 |
| 2005/0229558 A1 | | 10/2005 | Stelzer |
| 2006/0185514 A1 | * | 8/2006 | Schwalm ............... B64D 13/06 96/4 |
| 2009/0139191 A1 | * | 6/2009 | Roundy ................. F02C 7/052 55/392 |
| 2009/0139200 A1 | * | 6/2009 | Colaprisco ............ F04D 29/70 60/39.092 |
| 2010/0162682 A1 | | 7/2010 | Lerg |
| 2014/0158833 A1 | * | 6/2014 | Braeutigam ........... B64D 33/02 244/53 B |
| 2014/0169944 A1 | | 6/2014 | Milan et al. |
| 2015/0367945 A1 | * | 12/2015 | Stadler .................. B64D 27/10 415/144 |
| 2016/0075439 A1 | * | 3/2016 | Mores .................... F02C 7/055 244/53 B |
| 2016/0146511 A1 | | 5/2016 | Hipsky et al. |
| 2016/0177724 A1 | * | 6/2016 | Sheoran ................ B64D 33/00 415/121.2 |
| 2016/0245152 A1 | * | 8/2016 | Thomassin ......... F02B 29/0406 |
| 2018/0043986 A1 | * | 2/2018 | Miller .................... B64C 27/14 |
| 2018/0306112 A1 | * | 10/2018 | Kippel ................... F02C 7/057 |

FOREIGN PATENT DOCUMENTS

| | | | |
|---|---|---|---|
| EP | 2995556 A1 | 3/2016 | |
| EP | 3091211 A1 * | 11/2016 | ............. F02C 7/052 |
| WO | 2008143696 A2 | 11/2008 | |

OTHER PUBLICATIONS

Search report in EP application No. 19151431.4 dated May 15, 2019.
Response to Examination Report dated Oct. 28, 2020, from counterpart European Application No. 19151431.4, filed Feb. 5, 2021, 9 pp.
Examination Report from counterpart European Application No. 19151431.4, dated Oct. 28, 2020, 5 pp.

* cited by examiner

FOLDABLE RAM AIR INLET FILTER

BACKGROUND OF THE INVENTION

The present invention generally relates to air filters and, more particularly, to apparatus and methods for filtering RAM air of a vehicle.

On modern commercial aircraft, the aircraft Environmental Control System (ECS) provides conditioned air and cabin pressurization for the crew, passengers and avionics. Failure of the ECS system can cause flight delay, flight cancellation and unscheduled maintenance. Data for the years 2012 to 2014 from Air China airlines show that for a fleet of one hundred twenty 737NG aircraft, due to ECS failure, the annual cost for maintenance was $3.3 M and for dispatch was $1.1 M. Further analysis reveals that most of the failures are due to overheating or parts wearing out in the Air Cycle Machine (ACM), which is the cooling pack of the ECS.

A typical ACM removes the heat from the aircraft bleed air by heat exchangers and RAM air. Then, the conditioned air is distributed to the cabin. Water extracted from the air is sprayed to the heat exchangers to increase efficiency. A fan is installed in the RAM air path to increase air flow.

ACM overheating is due to clogged heat exchangers (i.e., the primary and the secondary heat exchangers). In addition, dust debris peel out from the heat exchanger can damage the impeller of the fan. The fan rotates fast during ACM operation. Consequently, excessive vibration on the ACM shaft wears out the bearings and damages the ACM.

There is no specific way to know, from outside of the aircraft, whether the heat exchangers are clogged. Only during scheduled maintenance will the heat exchanger inlet inspection/clean-out panel be opened for visual inspection.

FIG. 1 depicts a current RAM air inlet assembly 100. A RAM air 106 impinges an upstream deflector door 102. The deflector door 102 is moveable by an arm assembly 104 (downstream of the deflector door 102) that may include a series of tie-rods, link arms and torque shafts. The arm assembly can be actuated by an actuator 103. The arm assembly 104 can, via a modulation panel assembly 105 (downstream of the deflector door 102), move the deflector door 102. The RAM air 106 can continue through the inlet assembly 100 and into a RAM air duct 107.

When the actuator 103 retracts, it opens (i.e., lifts) the modulation panel assembly 105 and extends (i.e., lowers) the deflector door 102 into the flow of RAM air 106. During cruise flight, the deflector door 106 is folded. The modulation panel assembly 105 is controlled by the actuator 103 to adjust the RAM air 106 flow by changing the size of the cross section of the RAM air inlet.

When aircraft flaps are deployed during takeoff, or approach/landing, or the aircraft is on ground, the actuator can open the modulation panel and extend the deflector door 102.

The purpose of the deflector door is to prevent ice, slush, rocks and other unwanted material from going into the RAM air system. However, low weight particles, Catkins, and sands can still enter the RAM air system and clog the heat exchangers.

As can be seen, there is a need for improved apparatus and methods to minimize clogging and damage to heat exchangers downstream of air inlets.

SUMMARY OF THE INVENTION

In one aspect of the present invention, a filtering assembly that receives an inlet air comprises a modulation panel subassembly; an air filter subassembly downstream of the modulation panel subassembly; wherein the air filter subassembly is configured to discharge the inlet air from the filtering assembly; and an arm subassembly configured to move the modulation panel subassembly and to move the air filter subassembly; whereby the air filter subassembly moves into and out of a flow of the inlet air.

In another aspect of the present invention, a filtering assembly that receives an inlet air comprises an air filter subassembly downstream of an inlet air side of the filtering assembly; and an arm subassembly configured to move the air filter subassembly between a folded position and an extended position.

In a further aspect of the present invention, a filtering assembly that receives an inlet air comprises a modulation panel subassembly positioned at an air inlet side of the filtering assembly; and an air filter subassembly positioned at an air outlet side of the filtering assembly; wherein the modulation panel subassembly and the air filter subassembly are configured to concurrently move with one another.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides apparatus and methods of filtering inlet air, such as RAM air, that may enter downstream components that are susceptible to particulate damage, such as heat exchangers. Although the present invention is described in the context of aircraft, the present invention contemplates that it can be implemented in other vehicles and contexts.

Generally, the present invention includes a filtering assembly that has an upstream modulation panel subassembly upon which an air flow may initially impinge. An air filter subassembly is downstream of the modulation panel.

An arm subassembly can move the modulation panel subassembly which, in turn, can move the air filter subassembly into and out of the air flow.

Figure 1:
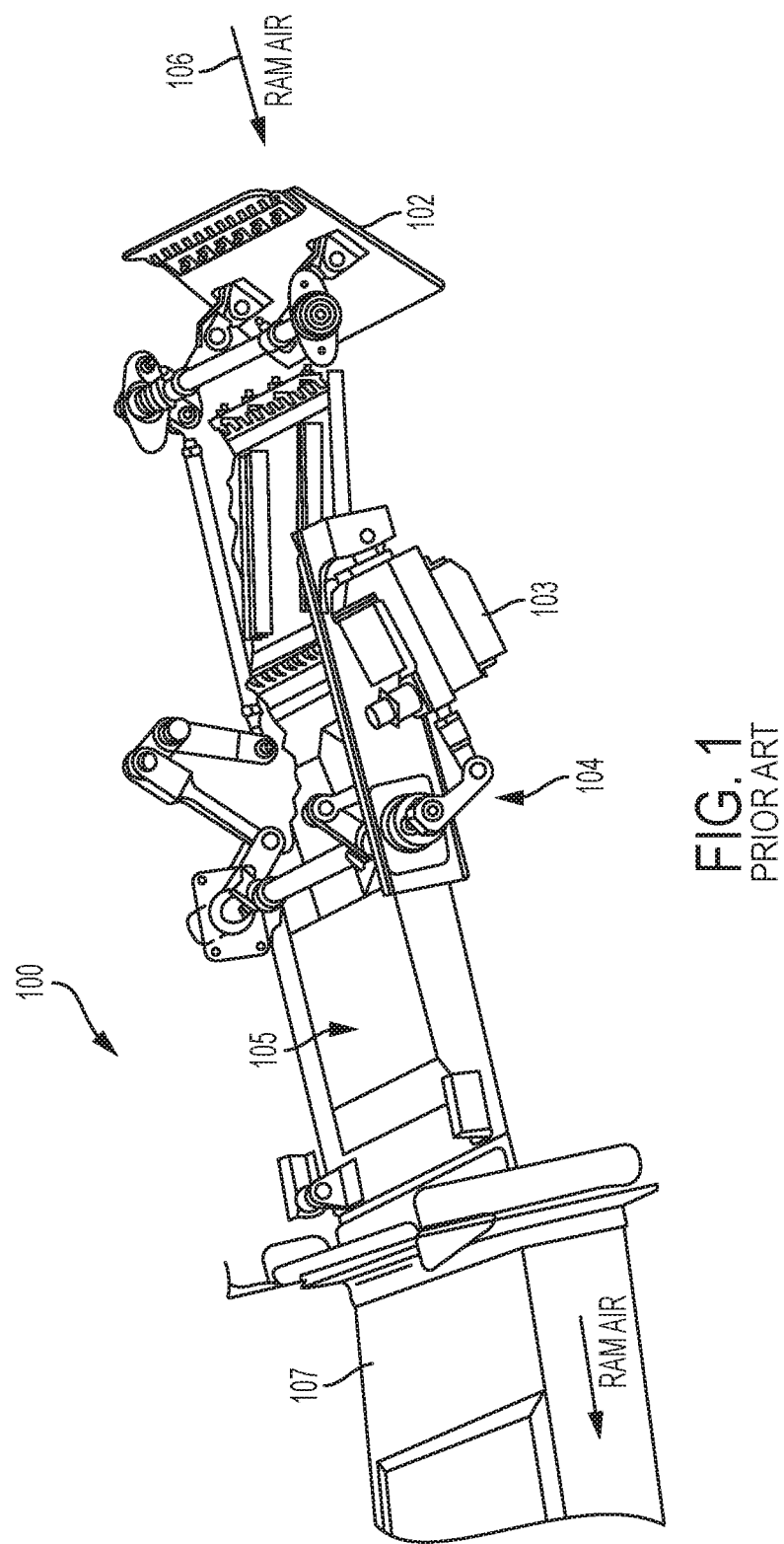
FIG. 1 is a perspective view of a prior air inlet assembly having a deflector door.
Figure 2:
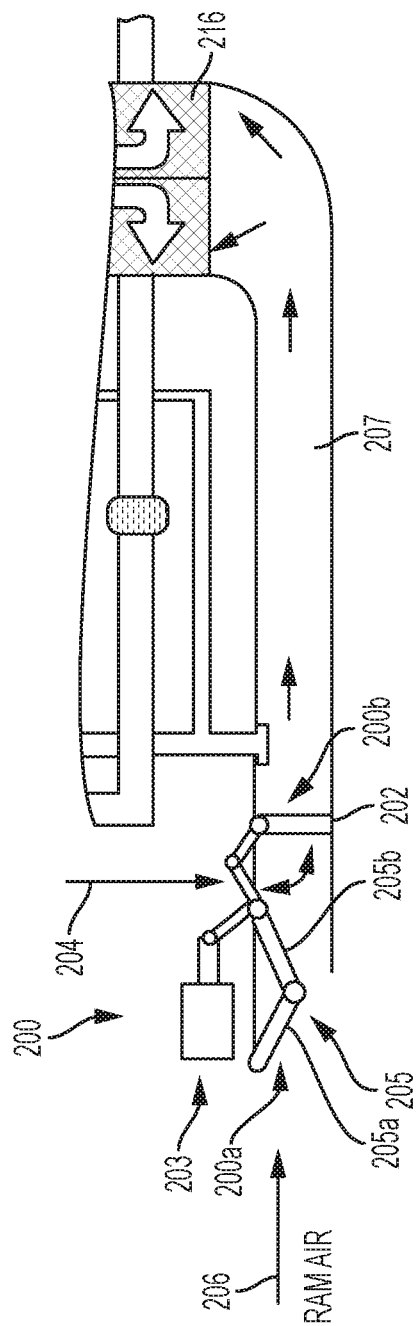
FIG. 2 is a schematic diagram of an air inlet assembly having a filter subassembly according to an embodiment of the present invention.

FIG. 2 schematically depicts, in a general fashion and in accordance with an exemplary embodiment, a filtering assembly 200 that can receive, at an air inlet side 200a, an inlet air 206, such as a RAM air entering an aircraft or other vehicle. In embodiments, the assembly 200 may be configured to filter and then discharge the inlet air 206, at an air outlet side 200b, into an air duct 207. In the air duct 207, a component 216 (which is downstream of the assembly 200) may be susceptible to damage from particulates in the inlet air 206. In embodiments, the downstream component 216 is a heat exchanger. In embodiments, the heat exchanger is part of an environmental control system in a vehicle such as an aircraft.

The assembly 200 may include an upstream modulation panel subassembly 205 configured and positioned at the inlet air side 200a where the inlet air 206 initially enters or impinges the assembly 200. In embodiments, the modulation panel subassembly 205 may have a first (i.e., upstream) modulation panel 205a and a second (i.e., downstream) modulation panel 205b, according to embodiments. The first and second modulation panels 205a, 205b may be configured to articulate with one another.

In embodiments, the filtering assembly 200 may further include an air filter subassembly 202 that is downstream of the modulation panel subassembly 205 and downstream of the air inlet side 200a where the inlet air 206 initially enters or impinges the assembly 200. The air filter subassembly 202 can be configured to discharge the inlet air 206 from the inlet air assembly 200 while positioned at the air outlet side 200b.

Having the air filter subassembly 202 positioned at the outlet side 200b, rather than at the inlet side 200a, enables the air filter subassembly 202 to better cover the entire cross section of the air duct 207 through which the inlet air flows.

In embodiments, the filtering assembly 200 may also include an arm subassembly 204. An actuator 203 may be upstream of the air filter subassembly 202. In embodiments, the actuator 203 may be directly connected with the arm subassembly 204. Also, the actuator 203 may be indirectly connected with the filter subassembly 202. Consequently, in embodiments, the arm subassembly 204, via the actuator 203, can actuate the modulation panel subassembly 205. Concurrently, the arm subassembly 204, via the actuator 203, can actuate the air filter subassembly 202.

Figure 3A:
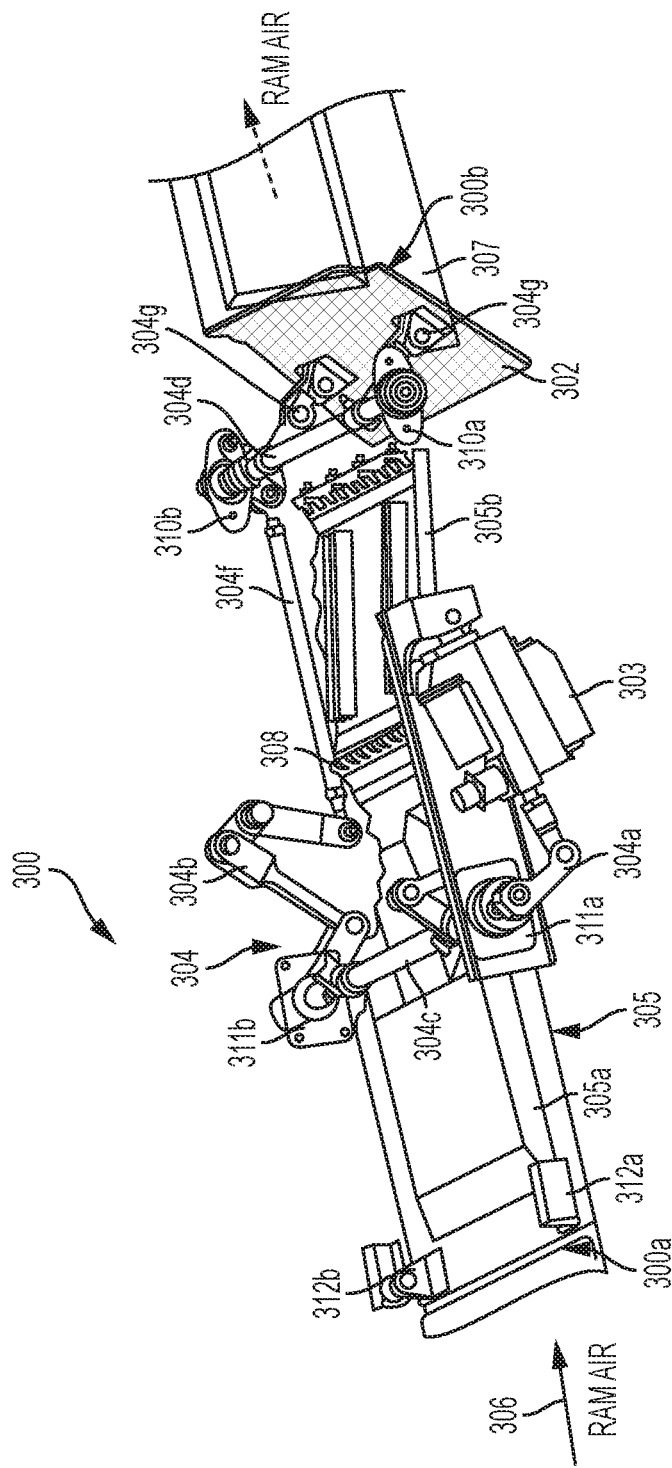
FIGS. 3A-3B are perspective views an air inlet assembly having a filter subassembly according to another embodiment of the present invention.
Figure 3B:
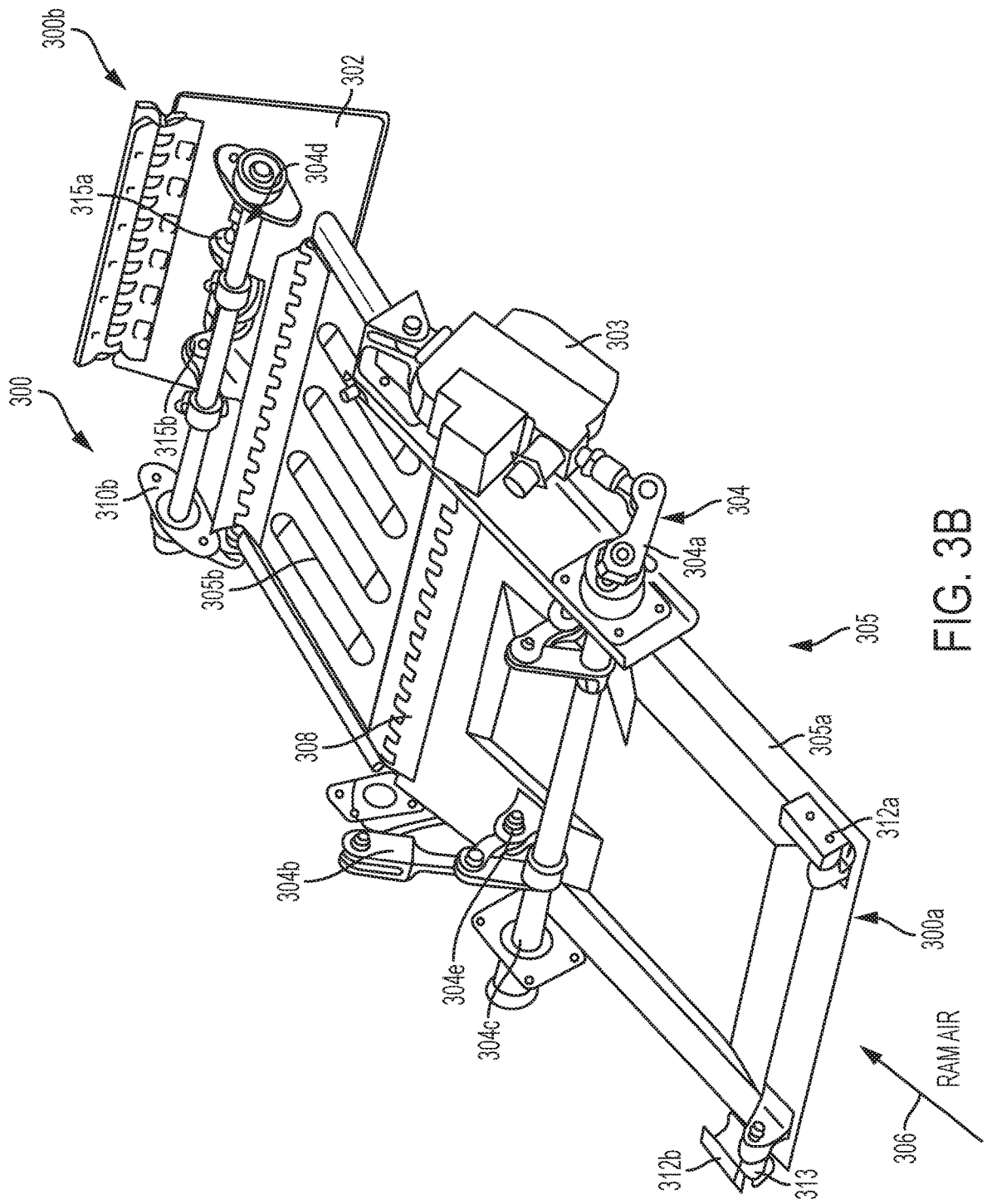

FIGS. 3A-3B show another exemplary embodiment of a filtering assembly 300. The assembly 300 may be similar in design to the filtering assembly 200 and, therefore, reference numbers for components in the assembly 300 parallel the reference numbers for components in the assembly 200.

Like the filtering assembly 200, the filtering assembly 300, in accordance with embodiments, may include an upstream modulation panel subassembly 305, a downstream air filter subassembly 302, an arm subassembly 304, and an actuator 303.

The actuator 303 may be positioned at a lateral side of the assembly 300. In embodiments, the actuator 303 may be pneumatically operated and directly connected to the arm subassembly 304. The actuator 303 may also be indirectly connected, via the arm subassembly 304, to the both the modulation panel subassembly 305 and the filter subassembly 302. Thereby, the actuator 303 may actuate movement of the modulation panel subassembly 305 and the air filter subassembly 302. In embodiments, the actuated movement may be concurrent.

In embodiments, the modulation panel subassembly 305 may include an upstream modulation panel 305a (adjacent the air inlet side 300a) and a downstream modulation panel 305b. In embodiments, the panels 305a, 305b can be positioned in an end-to-end relationship and be configured to articulate about a hinge 308 between the panels. When articulated, the modulation panel subassembly 305 can move between a folded position and an extended (i.e., flat) position. In FIGS. 3A-3B, the panel subassembly 305 is shown in a folded position.

The arm subassembly 304 may include a series of rods, linkage arms, and shafts, according to embodiments. One portion (e.g., half) of the arm subassembly 304 may extend, between the air inlet side 300a and the air outlet side 300b, along one side of the modulation panel subassembly 305. Another portion (e.g., another half) of the arm subassembly 304 may extend, between the air inlet side 300a and the air outlet side 300b, along an opposite side of the modulation panel subassembly 305. In embodiments, each of the foregoing portions (e.g., halves) may be symmetrically designed.

In embodiments, the arm subassembly 304 may include an actuating arm 304a connected to the actuator 303. In the arm subassembly 304, the actuating arm 304a may be linked to a rotating shaft 304c that is supported by a pair of supports 311a, 311b, of which one or both may be affixed to an interior of an air duct 307. The rotating shaft 304c may be affixed to a pair of linkage arms 304b. In turn, a pair of supports 304e, affixed to the modulation panel subassembly 305, may support the linkage arms 304b.

The pair of linkage arms 304b may be respectively connected to, at one ends thereof, a pair of connecting rods 304f of the arm subassembly 304, in embodiments. At the other ends thereof, a rotating shaft 304d may be connected to the connecting rods 304f. A pair of supports 310a, 310b may support the shaft 304d and be affixed to the interior of the air duct 307. The connecting rods 304f may connect, via linkage arms 304g, to the air filter subassembly 302.

As noted above, arm subassembly 304 is affixed, via the supports 304e, to the modulation panel subassembly 305. In embodiments, the supports 304e may be affixed to the upstream modulation panel 305a. Thereby, when the actuator 303 moves the actuator arm 304a, and the shaft 304c rotates, the modulation panel 305a articulates about the hinge 308. In turn, the modulation panel 305b articulates about the hinge 308. In embodiments, as noted above, the articulation about the hinge 308 may move the panels 305a, 305b between a folded position and an extended position.

In embodiments, as the shaft 304c rotates, the shaft 304d may concurrently rotate. In turn, the air filter subassembly 302 may rotate about the shaft 304d. The rotation of the air filter subassembly 302 may cause it to move between a folded position and an extended position (depicted by the arrow in FIG. 2). Moving between the folded and extended positions can enable the air filter subassembly to move into and out of the flow of inlet air 306.

It can be advantageous to have the air filter subassembly 302 rotate towards the upstream side of the filtering assembly 300 and into the folded position (FIG. 2). This can prevent particles captured by the air filter subassembly 202 from falling back into the inlet air flow.

Figure 4:
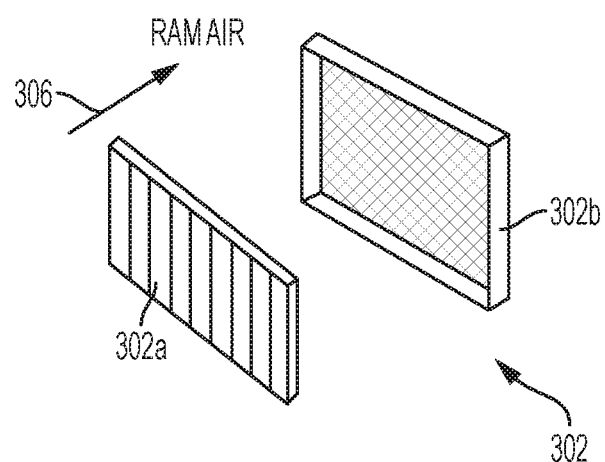
FIG. 4 is an exploded perspective view of a filter subassembly according to an embodiment of the present invention.

FIG. 4 depicts an exemplary embodiment of the air filter subassembly 302 which can have a filter 302a supported by a meshed plate 302b. In embodiments, the filter 302a can be removed and replaced from the meshed plate 302b.

As an example, the present invention can be utilized in the following fashion:

| Airplane Position | Flap Position | Modulation Panel Position | Filter Position |
|---|---|---|---|
| On Ground | Up or Down | Full Open | Extended |
| Takeoff | Down | Normal Open | Extended |
| Climb | Up | Moves Toward Closed Position | Retracted |
| Cruise | Up | Modulates Between Normal Open & Closed | Retracted |
| Approach | Down | Moves to Normal Open | Extended |
| Touchdown | Down | Drives to Full Open | Drives to Full Extend |

It should be understood, of course, that the foregoing relates to exemplary embodiments of the invention and that modifications may be made without departing from the spirit and scope of the invention as set forth in the following claims.

We claim:

1. A filtering assembly configured to receive an inlet air, the assembly comprising:
    a modulation panel subassembly positioned at an air inlet side of the filtering assembly, wherein the filtering assembly further comprises an air outlet side at which the filtering assembly is configured to discharge the inlet air into an air duct, wherein an air flow path extends from the air inlet side to the air outlet side;
    an air filter subassembly downstream of the modulation panel subassembly and positioned at the air outlet side, wherein the air filter subassembly is configured to discharge the inlet air from the filtering assembly; and
    an arm subassembly configured to move the modulation panel subassembly and to move the air filter subassembly,
    whereby the air filter subassembly moves into and out of a flow of the inlet air through the air flow path.

2. The assembly of claim 1, further comprising an actuator directly connected to the arm subassembly and configured to actuate movement of the arm subassembly to move the modulation panel subassembly and the air filter subassembly.

3. The assembly of claim 1, further comprising an actuator indirectly connected to the air filter subassembly and configured to actuate movement of the arm subassembly to move the modulation panel subassembly and the air filter subassembly.

4. The assembly claim 1, wherein the modulation panel subassembly is configured to articulate to move into and out of the flow of inlet air to change a size of a cross-section of an air inlet into the air duct.

5. The assembly of claim 1, wherein the assembly is configured to direct the inlet air to a component downstream of the assembly, wherein the component is susceptible to damage from particulates in the inlet air.

6. The assembly of claim 1, wherein the air filter subassembly is configured to move between a folded position and an extended position to move into and out of the flow of the inlet air through the air flow path.

7. The assembly of claim 1, wherein the arm subassembly is configured to move the air filter subassembly by at least rotating the air filter subassembly towards an upstream side of the filter assembly and into a folded position.

8. The assembly of claim 1, wherein the modulation panel subassembly comprises an upstream modulation panel and a downstream modulation panel positioned in an end-to-end relationship.

9. The assembly of claim 8, wherein the upstream modulation panel and the downstream modulation panel are configured to articulate about a hinge between the upstream modulation panel and the downstream modulation panel to change a size of a cross-section of an air inlet into the air duct.

10. A filtering assembly configured to receive an inlet air, the assembly comprising:
    a modulation panel subassembly positioned at an air inlet side of the filtering assembly, wherein the modulation panel subassembly comprises an upstream modulation panel and a downstream modulation panel, wherein the upstream and downstream modulation panels are configured to articulate with one another to move the modulation panel subassembly into and out of a flow of the inlet air;
    an air filter subassembly positioned downstream of the modulation panel subassembly and at an air outlet side of the filtering assembly;
    an actuator upstream of the air filter subassembly; and
    an arm subassembly configured to, via the actuator, move the modulation panel subassembly to move the upstream and downstream modulation panels into and out of the flow of the inlet air, and to move the air filter subassembly into and out of the flow of the inlet air.

11. The assembly of claim 10, wherein the actuator is connected to the arm subassembly and is configured to actuate movement of the arm subassembly to move the air filter subassembly between a folded position and an extended position.

12. The assembly of claim 10, wherein the actuator is connected to the air filter subassembly and is configured to actuate movement of the air filter assembly to move the air filter subassembly between a folded position and an extended position.

13. The assembly of claim 10, wherein the modulation panel subassembly is configured to move between a folded position and an extended position to move the upstream panel and the downstream panel into and out of the flow of inlet air to change a size of a cross-section of an air inlet configured to receive the inlet air.

14. The assembly of claim 10, wherein the arm subassembly is configured to move the air filter subassembly by at least rotating the air filter subassembly towards an upstream side of the filter assembly and into a folded position.

15. The assembly of claim 10, wherein the upstream modulation panel and the downstream modulation panel are configured to articulate relative to each other about a hinge between the upstream modulation panel and the downstream modulation panel.

16. The assembly of claim 10, wherein the arm subassembly is connected to the modulation panel subassembly and configured to move the upstream panel and the downstream panel into and out of the flow of inlet air to change a size of a cross-section of an air inlet configured to receive the inlet air.

17. The assembly of claim 10 wherein the modulation panel subassembly is configured to move concurrently with movement of the air filter subassembly.

18. A filtering assembly configured to receive an inlet air, the assembly comprising:
- a modulation panel subassembly positioned at an air inlet side of the filtering assembly and configured to change a size of a cross-section of an air inlet configured to receive the inlet air; and
- an air filter subassembly positioned downstream of the modulation panel subassembly and at an air outlet side of the filtering assembly,
- wherein the modulation panel subassembly and the air filter subassembly are configured to concurrently move with one another.

19. The assembly of claim 18, further comprising:
- an arm subassembly configured to actuate movement of the modulation panel subassembly and the air filter subassembly; and
- an actuator configured to control the arm subassembly to actuate the movement of the modulation panel subassembly and the air filter subassembly.

20. The assembly of claim 18, wherein:
- the inlet air is a RAM air; and
- the assembly is configured to be upstream of a heat exchanger of an environmental control system of an aircraft.

* * * * *